(12) United States Patent
Stokking et al.

(10) Patent No.: US 10,148,553 B2
(45) Date of Patent: Dec. 4, 2018

(54) ROUTING DATA IN A NETWORK

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Hans Maarten Stokking, Wateringen (NL); Frank Den Hartog, Voorschoten (NL); Bernardus Hillen, Zoetermeer (NL); Manuel Herrera Van Der Nood, Hellevoetsluis (NL); Robertus Smets, Utrecht (NL)

(73) Assignees: Koninklijke KPN N.V., Rotterdam (NL); Nederlandse Organisatie Voor Toegepast-Natuurwetenschappelijk Onderzoek TNO, 'S-Gravenhage (NL)

( * ) Notice: Subject to any disclaimer, the term of this patent is extended or adjusted under 35 U.S.C. 154(b) by 104 days.

(21) Appl. No.: 14/646,576

(22) PCT Filed: Nov. 25, 2013

(86) PCT No.: PCT/EP2013/074541
§ 371 (c)(1),
(2) Date: May 21, 2015

(87) PCT Pub. No.: WO2014/079999
PCT Pub. Date: May 30, 2014

(65) Prior Publication Data
US 2015/0350063 A1 Dec. 3, 2015

(30) Foreign Application Priority Data

Nov. 26, 2012 (EP) ..................... 12194164
Nov. 26, 2012 (EP) ..................... 12194171
(Continued)

(51) Int. Cl.
*H04L 12/707* (2013.01)
*H04L 12/66* (2006.01)
(Continued)

(52) U.S. Cl.
CPC .............. *H04L 45/22* (2013.01); *H04L 12/66* (2013.01); *H04L 41/5022* (2013.01);
(Continued)

(58) Field of Classification Search
CPC .......... H04L 47/10; H04L 47/30; H04L 47/12
See application file for complete search history.

(56) References Cited

U.S. PATENT DOCUMENTS 5,423,002 A * 6/1995 Hart ...................... H04L 12/462
370/401
8,391,255 B2 * 3/2013 Ribiere ................... H04L 47/10
370/254

(Continued)

FOREIGN PATENT DOCUMENTS

CN 1859495 11/2006
CN 102244612 A 11/2011
(Continued)

OTHER PUBLICATIONS

Rahman, Mustafizur, et al., "Medium Access Control for Power Line Communications: An Overview of the IEEE 1901 and ITU-T G.hn Standards," *IEEE Communications Magazine*, pp. 183-191, Jun. 2011.
(Continued)

*Primary Examiner* — Zhiren Qin
(74) *Attorney, Agent, or Firm* — Hamilton, Brook, Smith & Reynolds, P.C.

(57) ABSTRACT

A method and system is described for delivering data streams in a network comprising devices connected to the network via adapters and wherein at least some of the
(Continued)

devices are programmed to indicate priority of a data stream using priority parameter values of respective priority parameter types. One device in the network operates as a controller and the accompanying controller adapter is configured to perform priority enforcement on data streams according to all priority parameter types used within the datastreams in the network. A controller is also described and the controller can be a gateway configured to allow data streams into and out of the network. The method, system and controller find particular application in networks based on shared network segments, for example power line communication or networks based on coaxial cable.

22 Claims, 4 Drawing Sheets

(30) Foreign Application Priority Data

| Nov. 26, 2012 | (EP) | 12194175 |
| Nov. 26, 2012 | (EP) | 12194177 |
| Nov. 26, 2012 | (EP) | 12194178 |
| Nov. 26, 2012 | (EP) | 12194181 |

(51) Int. Cl.
    *H04L 12/857*    (2013.01)
    *H04L 12/813*    (2013.01)
    *H04L 12/851*    (2013.01)
    *H04L 12/24*     (2006.01)

(52) U.S. Cl.
    CPC .......... *H04L 47/20* (2013.01); *H04L 47/2433* (2013.01); *H04L 47/2491* (2013.01)

(56) References Cited

U.S. PATENT DOCUMENTS

| 8,687,965 B2* | 4/2014 | Pederson | H04B 10/1143 398/118 |
| 2003/0062990 A1* | 4/2003 | Schaeffer, Jr. | H04B 3/54 375/259 |
| 2004/0039833 A1* | 2/2004 | Ludwig | H04L 29/06 709/230 |
| 2005/0053119 A1* | 3/2005 | Day | H04L 12/18 375/130 |
| 2005/0141482 A1* | 6/2005 | Kleiner | H04L 29/06 370/352 |
| 2007/0070964 A1 | 3/2007 | Jang | |
| 2007/0153825 A1 | 7/2007 | Cho et al. | |
| 2007/0165668 A1 | 7/2007 | Liu | |
| 2007/0258459 A1 | 11/2007 | Smith et al. | |
| 2008/0089237 A1* | 4/2008 | Molen | H04L 47/10 370/252 |
| 2009/0059785 A1 | 3/2009 | Jogalekar et al. | |
| 2009/0300153 A1 | 12/2009 | Ray et al. | |
| 2010/0049830 A1* | 2/2010 | Chenu | H04B 3/54 709/218 |
| 2011/0047278 A1* | 2/2011 | Penston | G06F 17/30176 709/227 |
| 2011/0190967 A1* | 8/2011 | Burk | B60L 11/1846 701/22 |
| 2013/0058320 A1* | 3/2013 | Motonami | H04W 28/22 370/338 |
| 2013/0142055 A1* | 6/2013 | Bao | H04W 36/0011 370/252 |
| 2014/0019646 A1* | 1/2014 | Cadigan | G06F 1/185 710/5 |
| 2014/0330990 A1* | 11/2014 | Lang | G06F 9/4555 710/14 |
| 2015/0130276 A1* | 5/2015 | McNeill-McCallum | H02J 3/00 307/23 |
| 2016/0044542 A1* | 2/2016 | Kovacs | H04L 47/14 370/328 |

FOREIGN PATENT DOCUMENTS

| EP | 1 858 199 A2 | 11/2007 |
| JP | 2002-064540 | 2/2002 |
| JP | 2009-065572 | 3/2009 |
| WO | WO 2005/062652 A1 | 7/2005 |

OTHER PUBLICATIONS

Cisco Systems: "Implementing Quality of Service in a Wireless LAN," Internet citation, pp. 1-14, XP002697423, 2007. Retrieved from the Internet: http://www.cisco.com/en/US/docs/ios/wlan/configuration/guide/wi_implement_qos.pdf [retrieved on May 21, 2013].

Hwang, Wen-Shyang, et al., A QoS-aware Residential Gateway with Bandwidth Management, *IEEE Transactions on Consumer Electronics*, vol. 51, No. 3, pp. 840-848, Aug. 2005.

Zaballos, Agustin, et al., "QoS Broker Based Management for Heterogeneous Smart Electricity Networks," *IEEE*, pp. 295-297, 2010.

Brunner, M., "QoS Management in the Internet," Tutorial, Network Laboratories, NEC Europe Ltd., 2003.

Thorne, David, "HNID QoS Architectures," HGI, DMS@: HGI1712, Mar. 21, 2011.

Notification of Transmittal of the International Search Report and the Written Opinion of the International Searching Authority, PCT/EP2013/074541, "Routing Data in a Network", dated Mar. 14, 2014.

Extended European Search Report, EP 12 19 4181.9, dated May 31, 2013.

Extended European Search Report, EP 12 19 4164.5, dated May 31, 2013.

Extended European Search Report, EP 12 19 4171.0, dated May 31, 2013.

Extended European Search Report, EP 12 19 4175.1, dated May 31, 2013.

Extended European Search Report, EP 12 19 4177.7, dated May 31, 2013.

Extended European Search Report, EP 12 19 4178.5, dated May 31, 2013.

* cited by examiner

ROUTING DATA IN A NETWORK

This application is the U.S. National Stage of International Application No. PCT/EP2013/074541, filed Nov. 25, 2013, which designates the U.S., published in English, and claims priority under 35 U.S.C. §§ 119 or 365(c) to European Application No. 12194164.5, filed Nov. 26, 2012, European Application No. 12194171.0, filed Nov. 26, 2012, European Application No. 12194175.1, filed Nov. 26, 2012, European Application No. 12194177.7, filed Nov. 26, 2012, European Application No. 12194178.5, filed Nov. 26, 2012, and European Application No. 12194181.9, filed Nov. 26, 2012.

BACKGROUND TO THE INVENTION

The invention concerns a method of delivering data streams in a network comprising devices connected to the network via adapters, a system for delivering data streams, where the system comprises a network of devices attached to the network via adapters, and a controller for a network of devices in which the devices are attached to the network via an adapter.

It is known to form a local area network, or LAN, by coupling or connecting a selection of devices to each other for the purposes of communication. Examples of devices which may be connected or coupled to each other include computers, both desktop and laptop, printers, electronic devices generally which process information, and also hand held devices such as mobile phones, tablet devices and personal assistants. In particular such a network can be established in a home environment and includes personal computers, laptops, video recorders, DVD players, television set top boxes and other devices which process information which is of use to the persons residing in the home. As is known by the skilled person, sometimes devices in a network are known as nodes.

The installation of a physical network between devices can be complex and require sophisticated knowledge and skills. Additionally, sometimes it is neither appropriate nor desirable to provide additional cabling to connect up or couple devices in a network. In such a case a network can be set up using an existing shared network, such as a power line network, a network using existing coaxial or hybrid fiber-coaxial cables, for example a DOCSIS network, or a bus network, if any of these is already present in the physical locality where the network of devices is required. Power line networks are described, for example, in Medium Access Control for Power Line Communications: An Overview of the IEEE 1901 and ITU-T G.hn Standards, by Md. Mustafizur Rahman et al., IEEE Communications Magazine, July 2011, pp. 183-191.

A shared network has a limited physical capacity and will at any one time have a limited bandwidth due to the signals it is carrying. Bandwidth cannot be exceeded, therefore when devices that are attached to such a shared physical network attempt to deliver data to each other within the network, and there is insufficient bandwidth in the shared segments of the network, delivery of the signals is disrupted.

This problem can be overcome by prioritisation, for example by using DiffServ, as is known in the art, however there are several different schedules of prioritisation and in the event of a local area network constructed from different devices it may be that the different devices use different prioritisation schedules from each other, or in some cases use none at all.

Further to this, however, in such a shared network devices are connected to the network via adapters. Adapters are relatively unsophisticated devices which may or not have the ability to apply or enforce prioritisation of data streams.

Therefore it is a problem to ensure signal delivery in a local area network.

SUMMARY OF THE INVENTION

This problem is solved by the invention which is described in the claims.

A group of devices are typically networked because there is some advantage to the user in coupling them for the transfer of data. In a network data is typically transferred between networked devices and in the case of a home network in a domestic environment these devices would include home computers, laptops, internet broadcast controllers for the control and delivery of broadcast content for for example television, and other devices.

Devices in a network typically communicate with each other using streams of data, i.e. data streams. In this case the data stream can be any sequence of data, information, or for example bits, used to communicate between devices. Such data streams include the transmission of routine signaling between devices but also more complex streams for example programs, video clips and video streams, gaming programs and music streams etc.

Prioritisation schedules are known to the skilled person. A typical example of a prioritisation schedule is DiffServ. Alternative schemes include Priority Point Code (PCP) from 802.1p, user_priority parameter as specified in 802.1D and used in IEEE 1901, the channel access priority in 1901 FFT MAC and ITU-T G.hn or the Homeplug Channel Access (CA) priority. Prioritisation schemes use priority parameters to indicate relative priority between data or data streams. In some literature priority parameters are referred to as QoS, or Quality of Service, parameters and priority schemes are referred to as QoS control.

As is known by the skilled person, the use of priority parameters allows one data stream, to take priority over another data stream. Typically this means that the data stream with higher priority will be delivered before streams of lower priority. In effect, data with higher priority is allowed access to bandwidth before data of lower priority. If the data of higher priority functionally uses up bandwidth then other data may not be delivered at all or may only be partially delivered. As is known by the skilled person, priority schedules, otherwise known as priority schemes, allow one data stream to be given right of way over another.

As is known by the skilled person, giving priority to a certain data stream, or data flow, is a multiple step process. Firstly the priority of a particular stream or flow must be determined. To do this the stream must first be identified and then the correct priority identified, perhaps from a look up table, database or other data table or memory. Typically, certain types of flow will be given priority over other types. The allocation of priority is normally formalised in some way within a scheme. For example, video or voice traffic will normally have priority over file downloads. As such if a video or voice stream is identified it will be due a higher priority than, say, the download of an upgrade. In another example, if a VoIP session is initiated then voice traffic may require priority over all other types of traffic so that a live discussion between participants can proceed without undue latency or interruption. Alternatively, priority may be allocated to certain devices or types of device, or to certain programs.

Secondly, the identified priority must be allocated to the data stream. This is typically done by the allocation of a priority parameter, typically by insertion of the parameter into the data stream, normally into the header of the data stream. In DiffServ, for example, priority is marked using an index called a DiffServ Code Point, or DSCP.

Thirdly, priority must be enforced. This can be done, for example and as would be known by the skilled person, by priority queuing techniques in which devices read the priority parameters attached to the data streams and queue the data streams in order of their inserted priority parameters. In such a case a stream containing a higher priority parameter will be placed in the queue ahead of a stream with a lower priority parameter.

However, not all devices in a network will necessarily either all use methods of prioritisation, or all necessarily use the same method.

Even if all devices in a network could be relied upon to both use prioritisation and all use the same scheme, an additional problem arises when a network is formed using a shared network.

Devices in a network using shared network segments are connected to the network via adapters. An adapter converts signals between two types of network and is therefore able to convert signals between devices on a local area network and, say, the shared network segments. Sometimes the adapter is built into the device, in which case the adapter allows the device to have a direct connection to the shared segment. In the event that the network uses power line technology, for example, the adapters would typically be power line adapters. Other forms of shared network would require other forms of adapters. Adapters are normally relatively unsophisticated devices and there is no guarantee that the adapters will be able to apply priority enforcement. Thus the problem arises that devices in a network may be able to prioritise data streams, but the adapters, through which the data streams feed into the network, may not be able to.

In a further problem which occurs with such network, for example power line communication networks or coaxial cable networks, all wires or cables in the network are interconnected and therefore constitute a shared medium. Any signal entering onto any of the wires or cables will arrive at all other points within the network. This means that bandwidth must be shared, potentially amongst different data streams and has the potential to reduce bandwidth available for one signal, say, as other signals take bandwidth in the network.

All of these problems can be solved by rerouting traffic flows through a single device in the network, chosen to operate as a controller for the network, and in which problems of prioritisation, or of reduced bandwidth, say, can be solved.

If all data streams are rerouted to the controller, before being routed to the intended recipient of the data stream, then the controller can oversee and manage prioritisation functions. Such functions undertaken include determining priority, inserting priority parameters, transforming priority parameters and enforcing prioritisation and all of these functions can be undertaken when and if necessary.

However, the controller is also attached to the network via an adapter. The duties undertaken by the controller depend on the functionality available in the controller's own adapter. If the controller adapter is programmed or otherwise knows the functionality of all prioritisation schemes or technologies used within the network, or at least those used in the data streams which are rerouted to the controller, then two major embodiments of the invention occur. The working of the preferred embodiments, however, depends on the content of the priority parameters already inserted, or not, into the data streams at the network devices before they are routed to the controller.

The invention relates to a method of delivering data streams in a network. The network typically comprises devices connected to the network via adapters, and at least some of the devices are programmed to indicate priority of a data stream using priority parameter values of respective priority parameter types. The skilled person knows the priority parameter types. One device operates as a controller, in effect is designated as a controller and the controller adapter, i.e. the adapter through which the controller couples to the network, is either configured to perform priority enforcement on data streams according to all priority parameter types used within the data streams in the network, or configured to perform priority enforcement on data streams according to at least one but not all priority parameter types used within the data streams in the network, or is not configured to prioritise data streams according to any priority parameter types used within the network. In the method priority parameters are inserted into data streams in devices in the network and the data streams are introduced into the network at the devices. This will occur through the adapters at those devices. These data streams are for delivery to respective destination addresses within the network. However, instead of being addressed directly to their respective destination addresses, or final destination addresses, the data streams are routed first to the controller. This can be performed by addressing the data streams firstly to the controller, and by inserting the address of the intended final destination of each stream further down the header of each packet of the data stream. As the skilled person would appreciate, this could mean addressing packets to the controller on one layer and addressing packets to the intended destination in another layer. In particular the packets could be addressed to their intended destination at a lower layer than the layer used to address packets to the controller. As an alternative, a device could set up an IP tunnel between itself and the controller, as would be known by the skilled person, or, the network could be set up on the IP layer with a star topology centred on the controller device.

The difference between the preferred embodiments of the invention occurs once the packets have been received at the controller, in case the controller adapter is configured to perform priority enforcement on data streams according to all priority parameter types used within the data streams in the network. The controller has the functionality to perform the following steps.

In the first embodiment the controller transmits the data streams unaltered to the controller adapter when, i.e. in the event that, the priority parameter values of the data streams indicate that the data streams have different priorities from each other and where the priority parameter values are of priority parameter types supported by the gateway adapter. This may typically occur, for example, by arranging for the controller to read the priority values of all data streams as they arrive at the controller with an indication in the header that there is a further, final address to which the data streams must be sent. Ingress of the data streams into the network is then performed, for delivery to the respective destination addresses, at the controller adapter according to the priority parameter values carried in the data streams.

In a second embodiment, the controller further determines prioritisation of the data streams at the controller and inserts new priority parameter values which indicate the further determined prioritisation. This occurs when the priority parameter values of the data streams inserted at the devices indicate that the data streams cannot be prioritised by the controller adapter. This would occur for example if multiple streams had been given identical priorities, or when no priorities had been inserted. In a common example, some streams might have been prioritised but some not. In such an event the controller adapter would not know how to handle the unprioritised streams relative to the prioritised ones. In this second embodiment the new priority parameter values inserted at the controller allow the controller adapter to perform prioritisation of the data streams.

The data streams are then transmitted from the controller to the controller adapter and ingress of the data streams into the network is performed, for delivery to the respective destination addresses, at the controller adapter according to the priority parameter values carried in the data streams. In some cases these new priority parameter values will have been inserted by the controller, but in some cases, where for example priority parameter values were correctly inserted at the network devices and the controller judges that the controller adapter will be able to perform prioritisation, they may be the priority parameter values originally inserted at the network devices.

The method allows data streams to be delivered using prioritisation even when some or all of the adapters which are attached to the devices in the network from which the streams arise do not themselves enforce prioritisation. It also allows data streams to be delivered using prioritisation even when some or all of the devices in the network from which the streams arise do not themselves apply prioritisation values.

In case the controller adapter is configured to perform priority enforcement on data streams according to at least one but not all priority parameter types used within the data streams in the network, the controller has the functionality to perform the following steps.

In another embodiment the controller translates priority parameter values in the data streams that are of priority parameter types not supported by the controller adapter into those of a priority parameter type supported by the controller adapter. The controller further transmits the data streams from the controller to the controller adapter when the priority parameter values of the data streams indicate that the data streams have different priorities from each other. The data streams now include priority parameter values that are supported by the controller adapter, but also, the controller has ascertained that the priorities are such that the controller adapter can unambiguously enforce the priorities. The controller adapter then performs ingress into the network of the data streams for delivery to the respective destination addresses according to the priority parameter values carried in the data streams.

In yet another embodiment, the controller performs two actions. The controller further determines prioritisation of the streams at the controller and translates priority parameter values in the data streams that are of priority parameter types that are not supported by the controller adapter to those of a priority parameter type supported by the controller adapter, and inserts new priority parameter values which indicate the further determined prioritisation. In doing this the controller assesses the priority parameter values inserted at the devices in the network to ascertain if the priority parameter values can be read and understood by the controller adapter, in other words if they are of priority parameter types which are supported by the controller adapter. But also the controller assesses the priority parameter values inserted at the devices to ascertain if the priority parameter values could be unambiguously enforced by the controller adapter. If they could not be unambiguously enforced, for example if they are fully missing or partially missing, if they have been corrupted or if several data streams appear to have identical priorities, the controller further determines prioritisation of the data streams. The controller then inserts or translates appropriate priority values depending on the circumstances it finds. The controller may overwrite existing priority values with different values of the same priority parameter type when multiple streams appear to have identical priorities and the type is supported by the controller adapter.

The controller then transmits the data streams to the controller adapter. The controller adapter performs ingress into the network of the data streams for delivery to the respective destination addresses according to the priority parameter values carried in the data streams.

The method according to these last two embodiments allows data streams to be delivered using prioritisation even when some or all of the adapters which are attached to the devices in the network from which the streams arise do not themselves enforce prioritisation. It also allows data streams to be delivered using prioritisation even when some or all of the devices in the network from which the streams arise do not themselves apply prioritisation values.

In case the controller adapter is not configured to prioritise data streams according to any priority parameter types used within the network, the controller has the functionality to perform the following steps.

In yet another embodiment the controller enforces prioritisation of the data streams by transmitting the data streams according to the priority parameter values to the controller adapter for ingress into the network for delivery to the respective destination addresses, when the priority parameter values of the data streams indicate that the data streams have different priorities from each other. This may typically occur, for example, by arranging for the controller to read the priority values of all data streams as they arrive at the controller with an indication in the header that there is a further, final address to which the data streams must be sent. The controller then knows the relative priorities of the data streams and also knows that since they are different from each other that no further determination of priority need occur.

Typically the controller may queue data streams to the controller adapter in an appropriate order, according to the relative priority values of the data streams. Ingress of the data streams into the network is then performed, for delivery to the respective destination addresses, at the controller adapter. Alternatively, the controller may use other enforcement methods, such as scheduling or access control.

In yet another embodiment, the controller further determines prioritisation of the data streams, and then enforces the determined prioritisation of the data streams by transmitting the data streams according to the determined priority to the controller adapter for ingress into the network for delivery to the respective destination addresses. This embodiment occurs when there is insufficient information to prioritise the data steams based on the priority parameter values of the data streams inserted at the devices.

This might occur for example if multiple streams had been given identical priorities at the devices, or when no priorities had been inserted. In a common example, some streams might have been prioritised but some not. In such an event the controller further determines relative priority of the data streams.

The data streams are then transmitted from the controller to the controller adapter and ingress of the data streams into the network is performed, for delivery to the respective destination addresses.

In the last two embodiments the controller performs prioritisation.

The method according to these last two embodiments allows data streams to be delivered using prioritisation even when some or all of the adapters which are attached to the devices in the network from which the streams arise do not themselves enforce prioritisation. It also allows data streams to be delivered using prioritisation even when some or all of the devices in the network from which the streams arise do not themselves apply prioritisation values.

The invention further relates to a system for delivering data streams. The system comprises a network of devices attached to the network via adapters and one of the devices is a controller which is attached to the network via a controller adapter. At least some of the devices are configured to generate data streams, i.e. to produce data streams for egress out of the device, each for delivery to a destination address within the network, and these devices are further configured to indicate priority of the data streams using priority parameter values of a respective priority parameter type. The devices are further configured to route the data streams to the controller. The controller is configured to receive the data streams and the controller adapter is either configured to prioritise data streams according to all priority parameter types used within the network, or configured to perform priority enforcement on data streams according to at least one but not all priority parameter types used within the data streams in the network, or not configured to prioritise data streams according to any priority parameter types used within the network.

In case the controller adapter is configured to prioritise data streams according to all priority parameter types used within the network, there are two preferred system embodiments.

In the first embodiment the controller is configured to transmit the data streams unaltered to the controller adapter when the priority parameter values of the data streams indicate that the data streams have different priorities from each other and where the priorities are readable by the controller adapter. The controller adapter is configured to perform ingress of the data streams into the network for delivery to the respective destination addresses according to the inserted priority parameter values.

In the second embodiment the controller is configured to further determine prioritisation of the data streams and insert new priority parameters which indicate the further determined prioritisation when the priority parameter values of the data streams inserted at the devices indicate that the data streams cannot be prioritised by the controller adapter. The new priority parameters inserted at the controller allow the gateway adapter to perform prioritisation of the data streams. The controller is further configured to transmit the data streams comprising new priority parameters to the controller adapter, and the controller adapter is configured to perform ingress of the data streams into the network for delivery to the respective destination addresses according to the inserted new priority parameter values.

In case the controller adapter is configured to perform priority enforcement on data streams according to at least one but not all priority parameter types used within the data streams in the network, there are two further preferred embodiments.

In one embodiment the controller is configured to translate the inserted priority parameters that are of a priority parameter type not supported by the controller adapter to those of a priority parameter type supported by the controller adapter and is further configured to transmit the data streams from the controller to the controller adapter. The controller performs these actions when the priority parameter values of the data streams indicate that the data streams have different priorities from each other. Typically the controller will ascertain this by examining the data streams that arrive at the controller for delivery somewhere else in the network.

Having received the data streams the controller adapter is configured to perform ingress of the data streams into the network for delivery to the respective destination addresses according to the priority parameter values carried in the data streams.

In the other embodiment the controller is configured to further determine prioritisation of the data streams and translate priority parameter values in the data streams that are of a priority parameter type not supported by the controller adapter to those of a priority parameter type supported by the controller adapter, and configured to insert new priority parameters which indicate the further determined prioritisation when the priority parameter values of the data streams inserted at the devices indicate that the priority of the data streams cannot be enforced by the controller adapter.

The controller is further configured to then transmit the data streams to the controller adapter, which is configured to perform ingress of the data streams into the network for delivery to the respective destination addresses according to the priority parameter values carried in the data streams. Again, in this embodiment the controller performs two actions. It translates priority parameter values into a type supported by the controller adapter when data streams arrive at the controller bearing priority parameter values that the controller adapter will not understand. Also, the controller determines prioritisation when the contained priority parameter values would not be clear or unambiguous for the controller adapter, and inserts priority parameter values in the data streams before sending them to the controller adapter.

In case the controller adapter is not configured to prioritise data streams according to any priority parameter types used within the network, there are even two further preferred embodiments.

In one embodiment the controller is configured to enforce prioritisation of the data streams by transmitting the data streams according to the priority parameter values to the controller adapter for ingress into the network for delivery to the respective destination addresses, when the priority parameter values of the data streams indicate that the data streams have different priorities from each other.

In this embodiment the controller reads the priority parameter values inserted at the devices in the network and sees that the streams are prioritised relative to each other. The controller then knows which priorities to enforce and proceeds to enforce the priorities determined at the devices.

In a further embodiment the controller is configured to further determine prioritisation of the data streams and enforce prioritisation of the data steams by transmitting the data streams according to the determined priority to the controller adapter for ingress into the network for delivery to the respective destination addresses, when there is insufficient information to prioritise the data steams based on the priority parameter values of the data streams inserted at the devices. In this embodiment the controller reads the priority parameter values inserted at the devices and sees that priority cannot be unambiguously determined. This could occur for example because priority parameter values have not been inserted into all streams, or because they have been inserted but are unreadable or have become corrupted in some or all streams. The controller then proceeds to determine relative priority where appropriate and enforce the priorities of the data streams. Typically enforcement might occur by for example queuing, scheduling or access control.

The invention also relates to a controller for a network of devices in which the devices are attached to the network via an adapter and are configured to generate data streams for delivery within the network and are further configured to indicate priority of the data streams using priority parameter values of a respective priority parameter type. The controller is configured to be attached to the network via a controller adapter which is either configured to prioritise data streams according to all priority parameter types used within the data streams in the network, or configured to perform priority enforcement on data streams according to at least one but not all priority parameter types used within the data streams in the network, or not configured to prioritise data streams according to any priority parameter types used within the network. The controller adapter may be integrated into the controller or it may be provided as a separate device. The controller is configured to receive data streams from devices in the network. The data streams are for delivery to destination addresses within the network and carry priority parameter values indicating relative priority of the data streams.

In case the controller adapter is configured to prioritise data streams according to all priority parameter types used within the data streams in the network, there are two preferred controller embodiments and both embodiments can be worked in the same controller if the controller is provided with sufficient functionality.

In the first embodiment the controller is configured to transmit the data streams unaltered to the controller adapter when the priority parameter values of the data streams indicate that the data streams have different priorities from each other. In this embodiment the priorities are readable by the controller adapter.

In the second embodiment the controller is configured to further determine prioritisation of the data streams and insert new priority parameters which indicate the further determined prioritisation when the priority parameter values of the data streams inserted at the devices indicate that the data streams cannot be prioritised by the controller adapter. In this embodiment the new priority parameters inserted at the controller allow the controller adapter to perform prioritisation of the data streams. In this embodiment the controller is further configured to transmit the data steams comprising new priority parameters to the controller adapter.

In both embodiments the controller is configured to read data streams that arrive at the controller bearing an indication that they are for delivery to another device with in the network, and is configured to assess or determine any priority parameters attached to the data streams, and to assess priority of the data stream if priority parameters are somehow not available, have become scrambled or are somehow degraded or unreadable.

The controller can be a stand-alone device within the network. However, in a particularly advantageous embodiment the controller is a gateway device in the network. A gateway device is a device which allows data streams into and out of the network, it therefore resides on the edge of the network, as is known by the skilled person, and as such is particularly well placed to perform the method of the invention because typically all other devices in the network will be coupled to the gateway in order to receive data from outside the network. In many networks all devices will be coupled directly to the gateway and this means that the gateway is an efficient place in the network to perform the invention.

The skilled person knows how to construct a gateway and in particular a gateway for a home or residential network.

In an alternative embodiment the controller functionality can be incorporated into an existing device in the network. For example the controller and its functionality could be added as a program to a home computer or other networked device.

If the controller is also a gateway device for the network then the data streams which are rerouted to the gateway device for priority management must also compete for delivery with data streams coming into the network from outside. In another particularly advantageous embodiment the method of the invention further comprises only transmitting the data streams unaltered from the gateway to the gateway adapter when the priority parameter values of the data streams indicate that the data streams also have different priorities from any further streams entering the network through the gateway.

In an alternative embodiment the new priority parameters inserted at the gateway allow the gateway adapter to perform prioritisation of the data streams relative to further streams entering the network through the gateway.

Typically a controller will be programmed to perform the above and the skilled person will know how to do this. This can be done using rulesets, for example. The rulesets can be programmable for the particular network so that, for example, the data steams coming out of one particular device can always be prioritised over other data streams in the network. Alternatively the controller could be programmed to ensure priority for data streams addressed to a particular device, or to particular types of data stream, such as voice or video streams. Where the controller is a gateway device it can be pre-programmed with the appropriate functionality. In an alternative embodiment an existing gateway can be upgraded to the new functionality over the internet, either by downloading programming itself or by being the recipient of programming sent from outside the network, say from an appropriate configuration server.

In case the controller adapter is configured to perform priority enforcement on data streams according to at least one but not all priority parameter types used within the data streams in the network, there are two further controller embodiments and both embodiments can be worked in the same controller if the controller is provided with sufficient functionality.

In one embodiment the controller is configured to translate the inserted priority parameters that are of a priority parameter type not supported by the controller adapter to those of a priority parameter type supported by the controller adapter and to transmit the data streams from the controller to the controller adapter for ingress into the network, when the priority parameter values of the data streams indicate that the data streams have different priorities from each other.

In the other embodiment the controller is configured to further determine prioritisation of the data streams and translate priority parameter values in the data streams that are of a priority parameter type not supported by the controller adapter to those of a priority parameter type supported by the controller adapter, and insert new priority parameters which indicate the further determined prioritisation when the priority parameter values of the data streams inserted at the devices indicate that the priority of the data streams cannot be enforced by the controller adapter.

The controller is further configured to transmit the data streams from the controller to the controller adapter for ingress into the network.

In both embodiments the controller is configured to read data streams that arrive at the controller bearing an indication that they are for delivery to another device with in the network, and is configured to assess or determine any priority parameters attached to the data streams, and to assess priority of the data stream if priority parameters are somehow not available, have become scrambled or are somehow degraded or unreadable.

The controller can be a stand-alone device within the network. However, in a particularly advantageous embodiment the controller is a gateway device in the network. A gateway device is a device which allows data streams into and out of the network, it therefore resides on the edge of the network, as is known by the skilled person, and as such is particularly well placed to perform the method of the invention because typically all other devices in the network will be coupled to the gateway in order to receive data from outside the network. In many networks all devices will be coupled directly to the gateway and this means that the gateway is an efficient place in the network to perform the invention.

The skilled person knows how to construct a gateway and in particular a gateway for a home or residential network.

In an alternative embodiment the controller functionality can be incorporated into an existing device in the network. For example the controller and its functionality could be added as a program to a home computer or other networked device.

If the controller is also a gateway device for the network then the data streams which are rerouted to the gateway device for priority management must also compete for delivery with data streams coming into the network from outside. In another particularly advantageous embodiment the translated priority parameters allow prioritisation relative to any data streams entering the network through the gateway.

In an alternative embodiment the priority parameter values in the data streams that arrive at the controller adapter allow prioritisation relative to any data streams entering the network through the gateway.

Either embodiment can be used with either main embodiments of the method, system or controller of the invention.

Typically a controller will be programmed to perform the above and the skilled person will know how to do this. This can be done using rulesets, for example. The rulesets can be programmable for the particular network so that, for example, the data steams coming out of one particular device can always be prioritised over other data streams in the network. Alternatively the controller could be programmed to ensure priority for data streams addressed to a particular device, or to particular types of data stream, such as voice or video streams. The rulesets can include conversion data which allows the controller to translate priority parameter values from priority parameter types not supported by the controller adapter to priority parameter types which are supported by the controller adapter. Where the controller is a gateway device it can be pre-programmed with the appropriate functionality. In an alternative embodiment an existing gateway can be upgraded to the new functionality over the internet, either by downloading programming itself or by being the recipient of programming sent from outside the network, say from an appropriate configuration server.

In case the controller adapter is not configured to prioritise data streams according to any priority parameter types used within the network, there are two further controller embodiments and both embodiments can be worked in the same controller if the controller is provided with sufficient functionality.

In one embodiment the controller is configured to enforce prioritisation of the data streams by transmitting the data streams according to the priority parameter values to the controller adapter for ingress into the network for delivery to the respective destination addresses, when the priority parameter values of the data streams indicate that the data streams have different priorities from each other.

In the other embodiment the controller is configured to further determine prioritisation of the data streams and enforce prioritisation of the data streams by transmitting the data streams according to the determined priority to the controller adapter for ingress into the network for delivery to the respective destination addresses, when there is insufficient information to prioritise the data steams based on the priority parameter values of the data streams inserted at the devices. The controller transmits the data streams to the controller adapter which then performs ingress of the data streams onto the network.

In both embodiments the controller is configured to read data streams that arrive at the controller bearing an indication that they are for delivery to another device with in the network, and is configured to assess or determine any priority parameters attached to the data streams, and to assess priority of the data stream if priority parameters are somehow not available, have become scrambled or are somehow degraded or unreadable.

The controller can be a stand-alone device within the network. However, in a particularly advantageous embodiment the controller is a gateway device in the network. A gateway device is a device which allows data streams into and out of the network, it therefore resides on the edge of the network, as is known by the skilled person, and as such is particularly well placed to perform the method of the invention because typically all other devices in the network will be coupled to the gateway in order to receive data from outside the network. In many networks all devices will be coupled directly to the gateway and this means that the gateway is an efficient place in the network to perform the invention.

The skilled person knows how to construct a gateway and in particular a gateway for a home or residential network.

In an alternative embodiment the controller functionality can be incorporated into an existing device in the network. For example the controller and its functionality could be added as a program to a home computer or other networked device.

If the controller is also a gateway device for the network then the data streams which are rerouted to the gateway device for priority management must also compete for delivery with data streams coming into the network from outside. In another particularly advantageous embodiment the method of the invention further comprises only enforcing the priority of the data streams when the priority parameter values of the data streams indicate that the data streams also have different priorities from any further streams entering the network through the gateway.

In the event that there is a clash of priority between data streams from within the network and data streams arriving from outside the network the controller must perform further actions. Typically the controller must further determine relative priority of the data streams, taking into account the priority of the data streams entering the network. In an alternative, the controller may also be able to alter the priority parameter values of the data streams entering the network and this provides an extra degree of freedom for the controller.

In an alternative embodiment the prioritisation determined at the controller allows the controller to perform, in other words enforce, prioritisation of the data streams relative to further streams entering the network through the gateway.

Typically a controller will be programmed to perform the above and the skilled person will know how to do this. This can be done using rulesets, for example. The rulesets can be programmable for the particular network so that, for example, the data steams coming out of one particular device can always be prioritised over other data streams in the network. Alternatively the controller could be programmed to ensure priority for data streams addressed to a particular device, or to particular types of data stream, such as voice or video streams. Where the controller is a gateway device it can be pre-programmed with the appropriate functionality. In an alternative embodiment an existing gateway can be upgraded to the new functionality over the internet, either by downloading programming itself or by being the recipient of programming sent from outside the network, say from an appropriate configuration server.

In another advantageous embodiment the bandwidth of the network is first probed and the invention is worked only if the bandwidth requirements of the data streams exceeds the capacity of the network. Probing of the network is known by the skilled person. Probing can be performed by the controller or in fact by any device. This embodiment is particularly advantageous when more than one data stream originates from a device within the network, or when data streams originate from more than one device in the network.

If the probing is performed by the controller and a period of high traffic is detected then the controller can, for example, signal devices in the network to start rerouting data streams to the controller for priority management. The skilled person knows how to signal devices, for example using DHCP.

Although adapters are typically unsophisticated devices some are programmed with rudimentary ability to communicate with each other and to perform a degree of priority enforcement, as is known by the skilled person. This can be used by the controller to further manage data streams on the network.

Sometimes the adapters are able to communicate with each other on the priority indications in the streams that arrive at the various adapters for entering the shared segment, as is known by the person skilled in the art. This helps the adapters to give higher priority to streams with a higher priority indication, even though data streams enter the shared segment through different adapters. The invention can make use of this ability in certain situations. For example, the controller may give a certain priority to a data stream for entering the shared segment. The adapter of the controller may communicate on the priority of this stream with other adapters. In this way, other adapters can limit or entirely stop the data streams they put into the network, in favour of the stream given priority by the controller and entering the shared segment through the controller adapter. Even further, if a lower priority stream was rerouted to the controller previously, the controller may signal the device sending this lower priority stream to stop the rerouting. In this situation, the adapter for this sending device will limit or stop the data stream of this lower priority stream.

Even though the adapters may have some ability to enforce prioritisation, the invention is still advantageous because rerouting to the controller means that one device, the controller, can still take the ultimate decision. But even further this is particularly advantageous if the controller is also a gateway and further data streams enter into the network from outside. While adapters may have the ability to enforce some prioritisation they, or the devices which are behind them, will not necessarily know when data streams come into the network from outside so rerouting streams to the controller when the controller is a gateway still ensures that the device with the most knowledge takes ultimate decisions about prioritisation within the network.

Typically the network is a shared network and includes shared network segments and in a particularly advantageous embodiment the invention is worked when the combined bandwidth of the data streams exceeds the capacity of the network.

In a particularly advantageous embodiment the network is a power line network and the adapters are power line adapters. Power line communication is common in domestic residences and this embodiment has the particular advantage that it allows the creation of an efficient and fairly economical network in a domestic residence using existing structures. Therefore the invention allows management of priority of different traffic flows, and in particular IP flows, in a home network that uses power line communication. Thus a network can be constructed which uses existing wires to carry data traffic and that data traffic can be carried without experiencing reduced traffic flow due to lack of capacity in the network.

In another particularly advantageous embodiment the network is a coaxial cable network and the adapters are adapters suitable for converting signals between the devices and the coaxial cables. In fact, and as will be appreciated by the skilled person, they will be DOCSIS-like adapters. This embodiment is particularly advantageous where there is an existing system of coaxial cabling.

As such the invention allows the managing of the QoS of different traffic flows in a packetised network. By performing a combination of rerouting data within the network to a controller which manages prioritisation, wherein the controller performs further management of prioritisation according to the prioritisation parameter values which may or may not already be inserted into the streams, it can be ensured that signals can be delivered in a local area network.

Further embodiments of the invention are described in the Figures.

As will be appreciated equivalent numbering is used across the figures to represent equivalent, similar or identical items.

Figure 1:
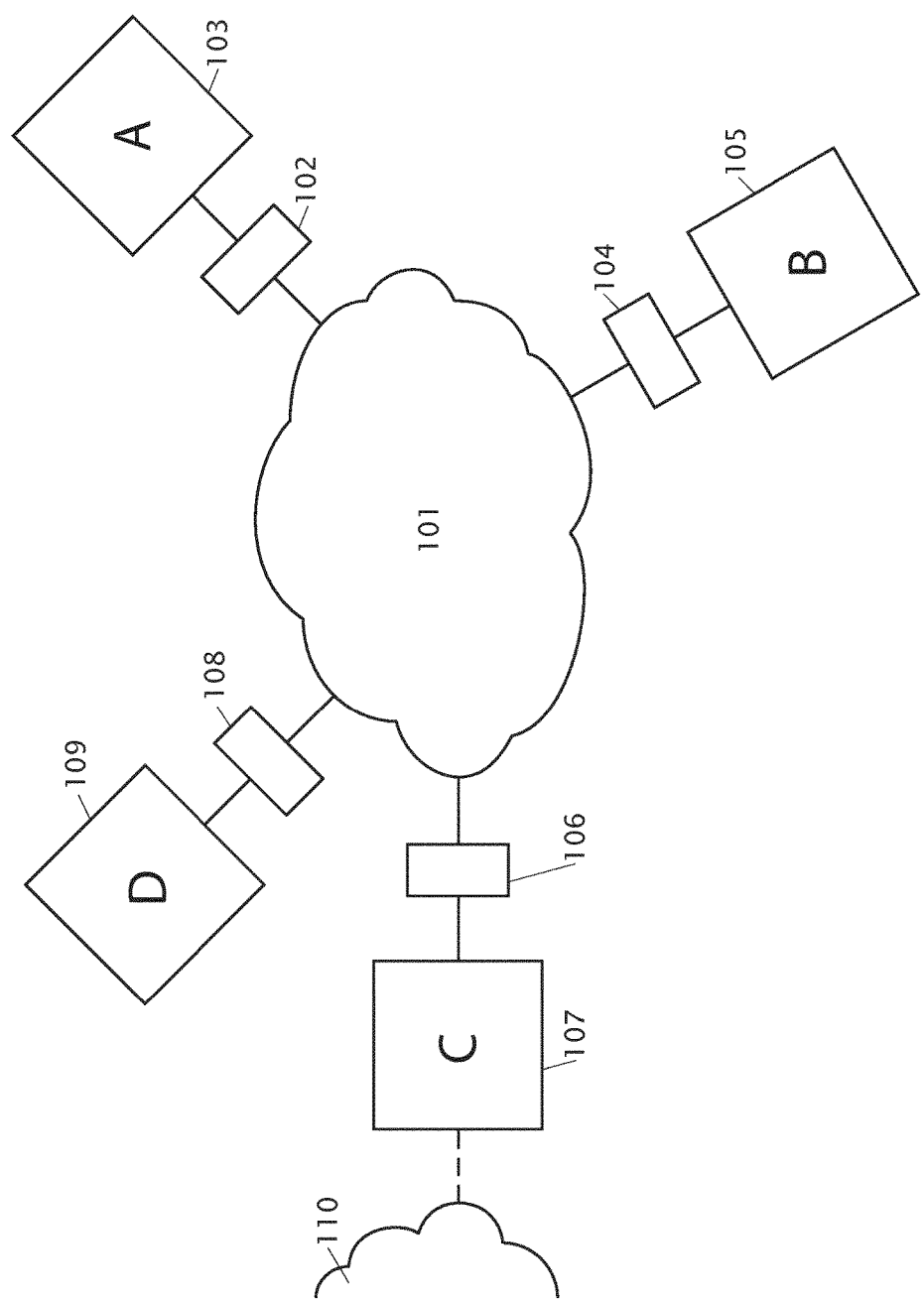
FIG. 1 shows a shared network in which the invention can be advantageously applied.

FIG. 1 shows a shared network 101 as might be established in a physical location, for example a residential home. Such a network may also be established in a commercial building or any other location with an existing shared network.

The network 101 connects devices A 103, B 105, C 107 and D 109 via their respective adapters 102, 104, 106 and 108. The adapters are typically layer 2 devices, as is known by the skilled person, layer 2 being the data link layer.

Devices A, B and C might a combination of home computers, laptops, set top boxes and may also include a gateway device which regulates the flow of data into and out of the network. In FIG. 1 device C, for example, might be a gateway device, in which case it is further coupled to the internet 110. However this is not necessary and the invention can be worked in an enclosed network in which the networked devices simply talk to each other and do not communicate with or receive data from outside the network. In an embodiment, the invention can be worked in a network with a gateway device even when the gateway device is not communication with the internet.

In the embodiment in which the shared network is a power line communication network then the network 101 comprises existing power wires as a carrier to carry data traffic within the network. Since all power wires are interconnected it is by definition a shared medium and therefore any signal put onto the wires at a certain point will arrive at all other points.

Figure 2:
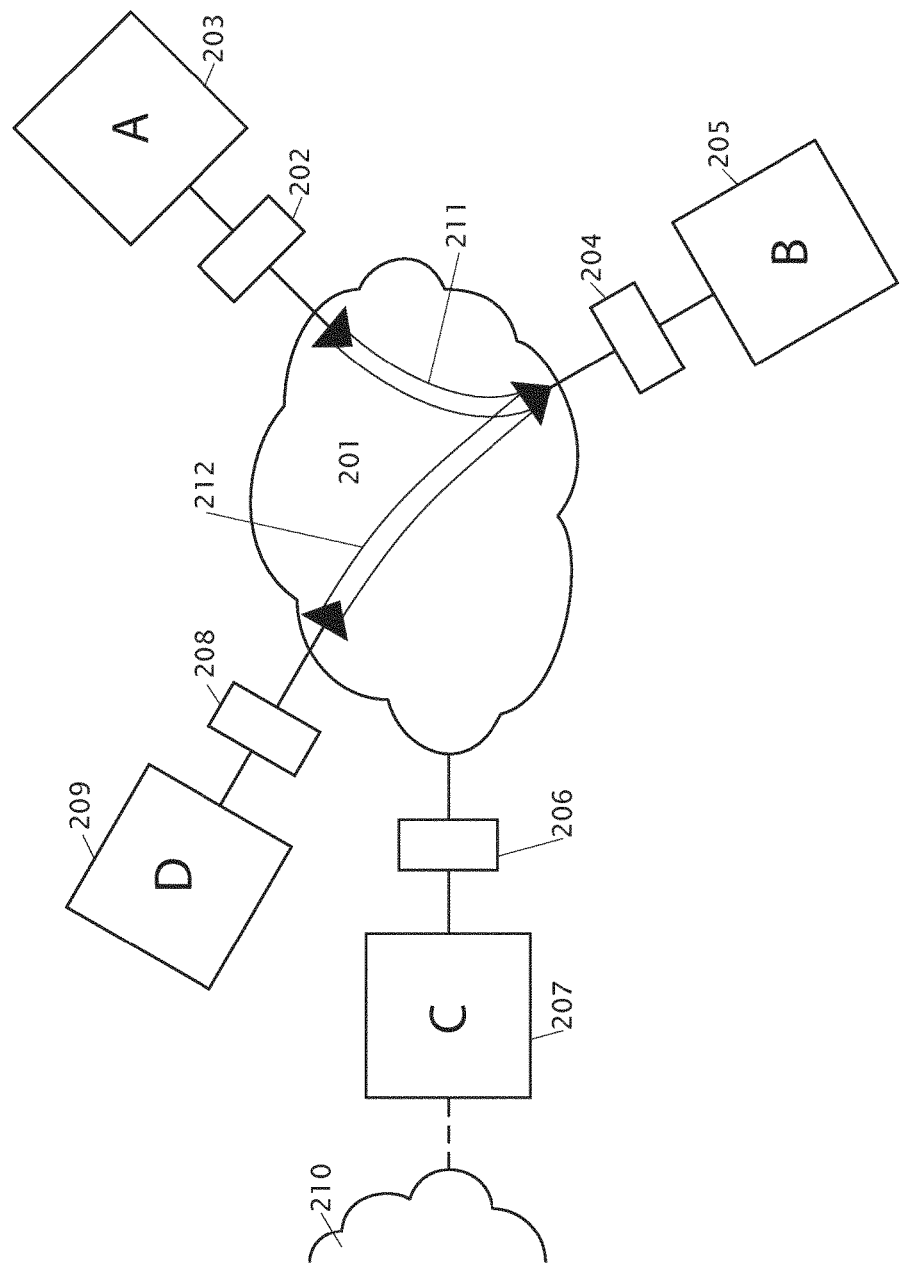
FIG. 2 shows a shared network in which the invention can be advantageously applied.

FIG. 2 shows the shared network 201, which may be for example a power line network, and which will have a limited capacity, say 65 MBit/sec as a typical realistic value, as measured on layer 4, the TCP/UDP layer. There are typically multiple traffic flows on the network at any one time and when these exceed the capacity not all flows will get through in real time.

Giving priority to certain flows allows at least certain services to use the network unhindered. Traffic flows which are allocated lower priority will typically experience insufficient bandwidth and this will typically result in late or extended delivery times.

If either or neither of adapters 202 and 208 are able to enforce priority of the data streams exiting devices A 203 and D 209, respectively, then data streams 211 and 212 may not be efficiently delivered to B 205.

If for example A 203 were to try to send a data stream 211 of 40 MBits/sec to B 205 while at the same time D 209 attempted to send another, different data stream 212 of 40 MBits/sec to B 205, available capacity of 65 MBit/sec will be exceeded. Neither data stream, 211 or 212 is likely to be delivered unhindered.

Figure 3:
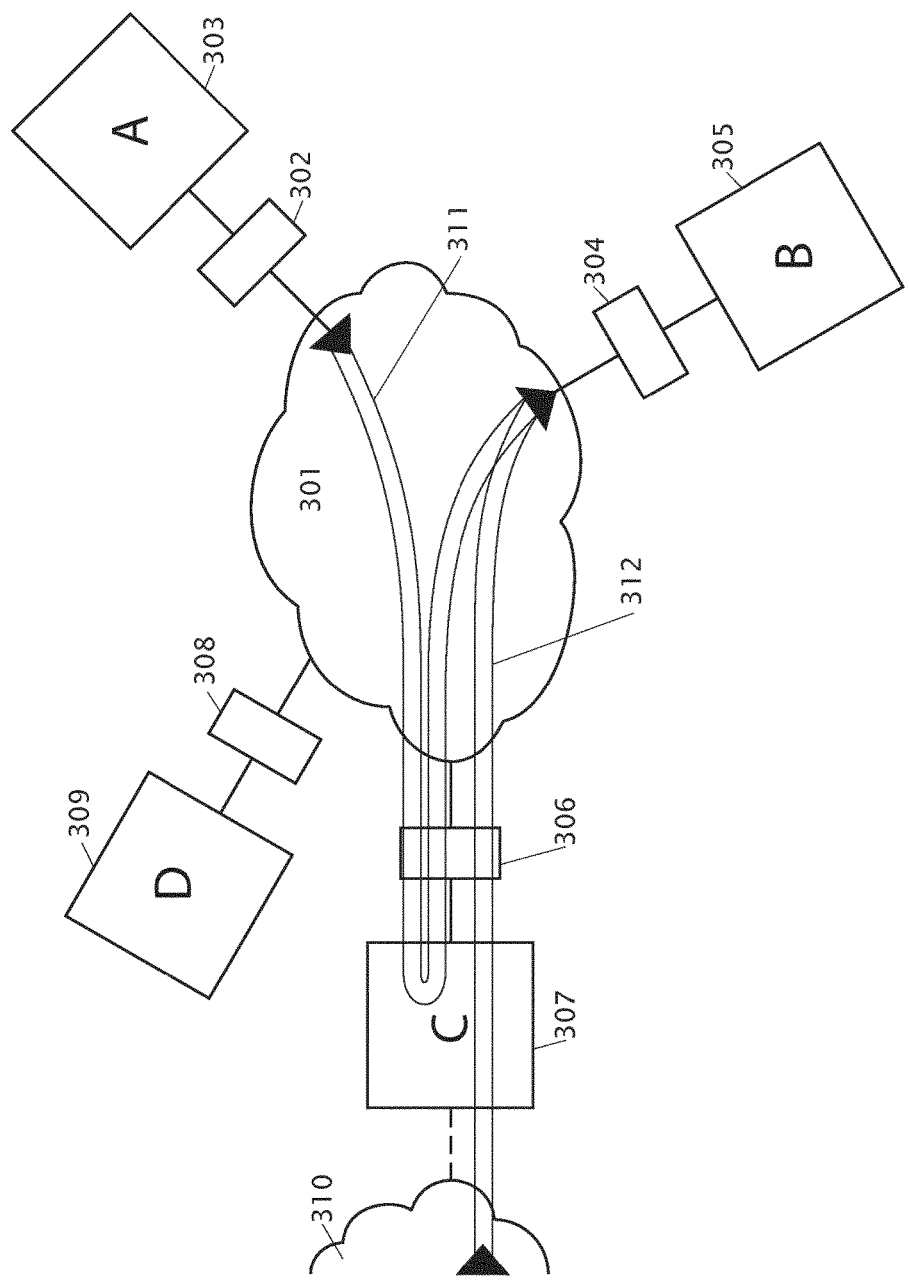
FIG. 3 shows an embodiment of the invention.

FIG. 3 shows an alternative embodiment of the invention. In this embodiment C 307 is also a gateway device connecting shared network 301 to internet 310. In this case steam of data 311, of say 30 Mbits per second, from device A 303 is to be delivered to device B 305 but additionally, stream 312, of say 40 Mbits per second, from outside the network arrives at gateway device 307 for delivery to device B 305.

In the situation that the controller adapter is configured to prioritise data streams according to all priority parameter types used within the data streams in the network, controller 307 is able to read the packet headers of both data streams 311 and 312 and either send both streams on to controller adapter 306 if controller 307 judges that the controller adapter can correctly enforce prioritisation, or, the controller 307 assesses that the controller will be unable to correctly enforce prioritisation and responds by determining the correct prioritisation and inserting priority parameter values that the controller adapter 306 will be able to enforce.

In the situation that the controller adapter is configured to perform priority enforcement on data streams according to at least one but not all priority parameter types used within the data streams in the network, the controller 307 is able to read the packet headers of both data streams 311 and 312 and priority parameter values are translated when they are of a priority parameter type not supported by controller adapter 306. When controller 307 discovered that any data stream could not be unambiguously prioritised by controller adapter 306 it determines prioritisation and inserts appropriate priority parameters, possibly overwriting existing priority parameter values.

In the situation that the controller adapter is not configured to prioritise data streams according to any priority parameter types used within the network, controller 307 is able to read the packet headers of both data streams 311 and 312 and if both data streams have different priorities will simply send both streams on to controller adapter 306 in such a way that both arrive on the network according to their relative priority. If data streams 311 and 312 do not clearly have different priorities, for example if the priorities are the same or if the priority of stream 311 is for some reason unreadable then the controller 307 determines the correct prioritisation where appropriate, and then transmits the data streams onto to the controller adapter 306, in the appropriate manner according to their determined relative priority.

In determining the correct prioritisation the controller may simply read off the prioritisation already indicated in the stream 312 originating from outside the network and translate it into a priority parameter type readable by the controller adapter 306, or, if data stream 312 does not already include priority parameters it may involve the controller determining the content of data stream 312 and determining a priority in such a way that the controller adapter 306 can correctly enforce priority between the two streams 311 and 312 when they are transmitted to the adapter 306 for ingress back into network 301.

While the controller C 307 is a home gateway device this is not necessary for the working of the invention. A gateway, however, is a very sophisticated device and offers advantages, because it can be programmed from outside the network with the functionality to perform the invention and can also be programmed to determine the functionality of its own adapter. This is particularly advantageous when the controller adapter is a separate device from the controller.

In the above example if stream 311 has priority then it can be delivered before stream 312, but as has been previously described, if the controller judges that stream 312 has priority it can signal device 303 to stop rerouting stream 311 while stream 312 is delivered.

Figure 4:
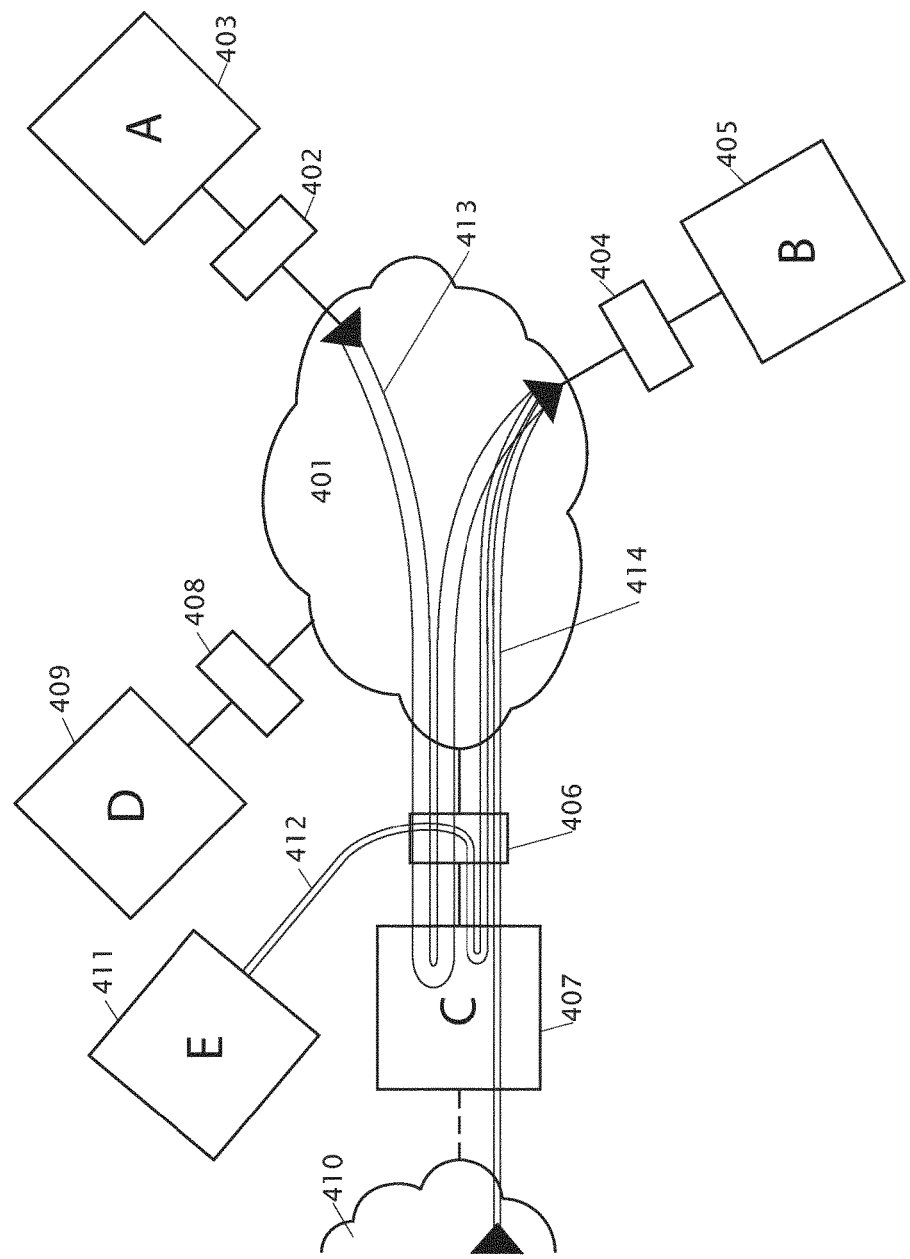
FIG. 4 shows an embodiment of the invention.

A single adapter can serve more than one device. FIG. 4 shows an alternative embodiment of the invention in which an extra device E 411 is behind, in network terms, the adapter 406 which already serves device C 407. If device E 411 wishes to send data stream 412 to device B 405 and A 403 also wishes to send data stream 413 to, say, B 405, then by routing both first to the controller C 407, their prioritisation and relative delivery can be managed by C 407. The same applies if device E 411 is behind any other adapter, say, adapter 408. Further, If device E 411 wishes to send data stream 412 to device B 405 and data stream 414 arrives from outside the network, also for delivery to B 405, then by routing stream 412 first to the controller C 407, the prioritisation and relative delivery of both streams can be managed by C 407.

Even if data stream 413 from device A 403 were intended for a different device, say D 409, the invention would still provide advantages, because the network 401 is a shared network. Both streams 412 and 413 can interfere with each other if not properly prioritised regardless of destination, simply because they coexist on the same network 401.

The invention claimed is:

1. A method of delivering data streams in a local area network comprising devices connected to the local area network via adapters, wherein the data streams are destined to respective destination addresses within the local area network and at least some of the devices are configured to indicate priority of a data stream and to insert priority parameter values of respective priority parameter types, the method comprising:
   rerouting all of the data streams through one of the devices configured to operate as a controller for the local area network, and wherein rerouting comprises routing the data stream to the controller regardless of destination addresses, and
   performing ingress of the data streams for delivery to respective destination addresses into the local area network according to the priority parameter values carried in the data streams.

2. The method according to claim 1 wherein the controller is connected to the local area network with a controller adapter and the controller is configured to
   either transmit the data streams unaltered from the controller to the controller adapter when the priority parameter values of the data streams indicate that the data streams have different priorities from each other and where the priority parameter values are of priority parameter types supported by the controller adapter, or
   further determine prioritization of the data streams at the controller when the priority parameter values of the data streams inserted at the devices indicate that the data streams cannot be prioritized by the controller adapter, and transmit the data streams from the controller to the controller adapter.

3. The method according to claim 2 wherein further determining prioritization of the data streams at the controller comprises
   inserting new priority parameter values which indicate the further determined prioritization, or
   translating priority parameter values in the data streams that are of priority parameter types not supported by the controller adapter into those of a priority parameter type supported by the controller adapter.

4. The method according to claim 2 wherein further determining prioritization of the data streams at the controller comprises
   inserting new priority parameter values which indicate the further determined prioritization, and
   translating priority parameter values in the data streams that are of priority parameter types not supported by the controller adapter into those of a priority parameter type supported by the controller adapter.

5. The method according to claim 1 wherein the controller is connected to the local area network with a controller adapter and the controller adapter is configured to enforce priority according to the priority parameter values carried in the data streams.

6. The method according to claim 1 wherein the controller is connected to the local area network with a controller adapter and the controller is configured to enforce priority according to the priority parameter values carried in the data streams.

7. The method according to claim 1 wherein the controller is a gateway device and further allows data streams into and out of the local area network.

8. The method according to claim 7 wherein the controller is connected to the local area network with a controller adapter and the controller adapter is configured to perform prioritization of the data streams relative to further streams entering the local area network through the gateway according to the priority parameter values carried in the data streams.

9. The method according to claim 7 wherein the gateway is configured to perform prioritization of the data streams relative to further streams entering the local area network through the gateway according to the priority parameter values carried in the data streams.

10. A system for delivering data streams in a local area network, the system comprising a local area network of devices attached to the local area network via adapters:
    wherein one of the devices is a controller and wherein the controller is attached to the local area network via a controller adapter,
    wherein at least some of the devices are configured to generate data streams, wherein the data streams are destined to respective destination addresses within the local area network, and are further configured to indicate priority of the data streams and insert priority parameter values of a respective priority parameter type, and are further configured to route the data streams to the controller,
    wherein the controller is configured to receive the data streams,
    and wherein the controller adapter is configured to perform ingress of the data streams into the local area network for delivery to the respective destination addresses according to the inserted priority parameter values.

11. The system according to claim 10 wherein the controller is configured to
    either transmit the data streams unaltered from the controller to the controller adapter when the priority parameter values of the data streams indicate that the data streams have different priorities from each other and where the priority parameter values are of priority parameter types supported by the controller adapter, or
    further determine prioritization of the data streams at the controller when the priority parameter values of the data streams inserted at the devices indicate that the data streams cannot be prioritized by the controller adapter, and transmit the data streams from the controller to the controller adapter.

12. The system according to claim 11 wherein further determining prioritization of the data streams at the controller comprises
    inserting new priority parameter values which indicate the further determined prioritization, or
    translating priority parameter values in the data streams that are of priority parameter types not supported by the controller adapter into those of a priority parameter type supported by the controller adapter.

13. The system according to claim 11 wherein further determining prioritization of the data streams at the controller comprises
    inserting new priority parameter values which indicate the further determined prioritization, and
    translating priority parameter values in the data streams that are of priority parameter types not supported by the controller adapter into those of a priority parameter type supported by the controller adapter.

14. The system according to claim 10 wherein the controller adapter is configured to enforce priority according to the priority parameter values carried in the data streams.

15. The system according to claim 10 wherein the controller is configured to enforce priority according to the priority parameter values carried in the data streams.

16. The system according to claim 10 wherein the controller is a gateway device configured to allow data streams into and out of the local area network.

17. A controller for a local area network of devices in which the devices are attached to the local area network via an adapter and are configured to generate data streams for delivery within the local area network and are further configured to indicate priority of the data streams using priority parameter values of a respective priority parameter type,
wherein the controller is configured to be attached to the local area network via a controller adapter,
wherein the controller is configured to receive data streams from devices in the local area network, which data streams are for delivery to destination addresses within the local area network, and wherein the data streams carry priority parameter values indicating relative priority of the data streams,
and wherein the controller is configured to transmit the data streams unaltered to the controller adapter when the priority parameter values of the data streams indicate that the data streams have different priorities from each other, which priorities are readable by the controller adapter, or wherein the controller is configured to further determine prioritization of the data streams when the priority parameter values of the data streams inserted at the devices indicate that the data streams cannot be prioritized by the controller adapter and transmit the data streams to the controller adapter.

18. The controller according to claim 17 wherein further determining prioritization of the data streams at the controller comprises
inserting new priority parameter values which indicate the further determined prioritization, or
translating priority parameter values in the data streams that are of priority parameter types not supported by the controller adapter into those of a priority parameter type supported by the controller adapter.

19. The controller according to claim 17 wherein the controller is further configured to enforce priority according to the priority parameter values carried in the data streams.

20. The controller according to claim 17 wherein the controller is further configured to operate as a network gateway and is configured to allow data streams into and out of the local area network.

21. The controller according to claim 20 wherein the gateway is further configured to perform prioritization of the data streams relative to further streams entering the local area network through the gateway according to the priority parameter values carried in the data streams.

22. The controller according to claim 17 wherein further determining prioritization of the data streams at the controller comprises
inserting new priority parameter values which indicate the further determined prioritization, and
translating priority parameter values in the data streams that are of priority parameter types not supported by the controller adapter into those of a priority parameter type supported by the controller adapter.

* * * * *